United States Patent [19]

Yamamoto

[11] Patent Number: 4,704,650
[45] Date of Patent: Nov. 3, 1987

[54] ORIENTED SHEET SUPPORTS IN A RECORDING DISC

[75] Inventor: Nobuyuki Yamamoto, Kanagawa, Japan

[73] Assignee: Fuji Photo Film Co., Ltd., Kanagawa, Japan

[21] Appl. No.: 889,974

[22] Filed: Jul. 28, 1986

[30] Foreign Application Priority Data

Aug. 6, 1985 [JP] Japan .............................. 60-171896

[51] Int. Cl.$^4$ .............................................. G11B 5/84
[52] U.S. Cl. ...................................... 360/135; 369/280
[58] Field of Search ........................... 360/133, 97–99, 360/135; 369/280, 287, 288

[56] References Cited

U.S. PATENT DOCUMENTS 4,464,693 8/1984 Gerfast ................................ 360/133
4,543,619 9/1985 Pastor ............................ 360/133 X

FOREIGN PATENT DOCUMENTS 0030623 6/1981 European Pat. Off. ............ 360/133

Primary Examiner—John H. Wolff
Attorney, Agent, or Firm—Sughrue, Mion, Zinn, Macpeak & Seas

[57] ABSTRACT

A recording disc in which two recording sheets are bonded to bonding rings at the inner and outer periphery on both sides of a circular substrate with a recess between the recording portion of the recordings sheets and the substrate. The sheets are formed of a support material anisotropy and a recording material deposited on the support. The sheets are bonded to the bonding rings with their directions of anisotropy aligned.

6 Claims, 3 Drawing Figures

ORIENTED SHEET SUPPORTS IN A RECORDING DISC

BACKGROUND OF THE INVENTION

1. Field of the Invention

This invention relates to a magnetic disc for magnetic recording in a direction parallel to or perpendicular to its surface.

2. Background Art

One example of a conventional magnetic disc is a rigid magnetic disc. The substrate of the rigid magnetic disc is made of rigid material. In general, the rigid magnetic disc employs an aluminum substrate JIS H 4000 A5086P for instance).

The rigid magnetic disc is generally formed as follows. An aluminum plate is machined on a lathe, and its surface is polished so that a data recording operation can be performed at high density because the space between the disc and the head is minimized. Thereafter, a magnetic layer is formed on the aluminum substrate by vacuum deposition or spin coating. For high density recording and reproducing, the surface of the disc should be smooth. However, it has been difficult for the conventional magnetic disc using the aluminum substrate to have a surface with a central line average roughness Ra of not more than 0.1 micrometers. Furthermore, since the substrate is rigid, in forming the magnetic layer, it is impossible to continuously coat the web with a magnetic material. Thus, handling of the conventional rigid substrate is rather troublesome. On the other hand, a high density recording operation is greatly affected by the dust on the disc. Therefore, it is essential to manufacture magnetic discs in a dust-proof environment. Accordingly, the magnetic disc manufacturing process is considerably intricate, thus requiring an enormous sum for investment in equipment.

The conventional substrate, such as an aluminum substrate, is rigid. Therefore the head should not contact the magnetic layer in tracing it. However, it is difficult to maintain constant the narrow space between the head and the magnetic layer, and therefore signal errors frequently occur. Further, it is very difficult to further reduce the space between the head and the disc surface to thereby increase the recording density. If the magnetic head is accidentally brought into contact with the disc during the tracing operation with the narrow space maintained, a sliding frictional force is produced because the substrate is rigid. As a result of this frictional engagement, a great impact is applied collectively to the part of the magnetic layer which has contacted the head, so much so as to break the disc surface, thus reducing the service life of the disc.

Furthermore, the aluminum substrate polished as described above is expensive.

On the other hand, a magnetic disc as shown in FIG. 1 has been proposed in the art. In this magnetic disc, recesses are formed in both sides of a disc substrate 1, and floppy discs or flexible discs 2 (hereinafter referred to as "flexible disc sheets") having a magnetic layer on one side are bonded on both sides of the substrate 1 in such a manner that the magnetic layers are exposed on the exterior of the disc and gaps 3 are formed between the substrate 1 and the inner surface of the flexible disc sheets 2.

The magnetic recording surfaces of the magnetic disc thus constructed are flexible. Therefore, even when the head is accidentally brought into contact with the magnetic recording surface, or when a higher density recording operation is carried out with the head held in contact with the magnetic recording layer, the magnetic layer is scarcely broken, unlike that of the rigid disc. Accordingly, the technique of flexible discs can be utilized as it is. Furthermore, a smooth magnetic layer that is highly durable can be used as a magnetic disc's magnetic layer. Thus, this type of magnetic disc is being watched with great interest since it eliminates the difficulties accompanying a conventional rigid magnetic disc.

The inventors have conducted intensive research on the magnetic disc of this type, and found that it still suffers from serious difficulties. In particular, when the flexible sheets are merely bonded on both the interior and exterior edges of the substrate 1 in such a manner as to form the gaps 3 as shown in FIG. 1, the magnetic disc may eventually be bent by the force of contraction of the flexible sheets 2 or when held at a high temperature (about 70° C.). Furthermore, the magnetic disc is bent by the variation of temperature or humidity. That is, the magnetic disc may be bent with variations of the environmental conditions.

The bending of the magnetic disc because of aging or high temperature is not reversible because it plastically deforms the substrate 1. On the other hand, bending of the magnetic disc because of temperature or humidity change is reversible and is generally too small to practically affect the magnetic disc. In the case where the magnetic disc is irreversibly bent by the contraction as was described above, spacing of the magnetic head from the disc surface becomes unsatisfactory, so that the output is decreased, at worst to zero. In fact, what occurs is that the spacing is reduced to zero as the head hits the disc surface, that is, the aimed high density recording operation cannot be carried out.

SUMMARY OF THE INVENTION

Accordingly, an object of this invention is to provide a magnetic disc which is not bent with time or in high temperature conditions.

Another object of the invention is to provide a magnetic disc with which a high density recording operation can be performed and no errors are caused in writing or reading signals.

Yet another object of the invention is to provide a magnetic disc which is high in durability and low in manufacturing cost.

The inventors have conducted intensive research on the above-described difficulties, and found that the primary causes for them arise from the anisotropy of the support of the flexible disc in the magnetic sheets. They have also found that the degree of bending of the magnetic disc can be decreased by arranging the flexible sheets on both sides of the substrate in such a manner that their supports coincide with each other in the direction of mechanical anisotropy (hereinafter referred to as "machine direction").

Therefore, in a magnetic disc in which flexible sheets are bonded on both sides of a substrate with gaps therebetween, according to the invention, the flexible sheets are so arranged that their supports coincide with each other in at least the direction of mechanical anisotropy and possibly in the optical axis direction.

DETAILED DESCRIPTION OF THE PREFERRED EMBODIMENTS

This invention will be described in detail.

Figure 1:
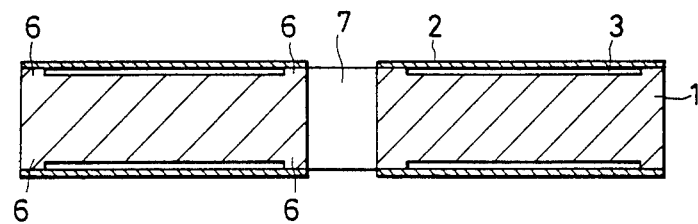
FIG. 1 is a sectional view showing one example of a magnetic disc to which the technical concept of the invention is applied.
Figure 2:
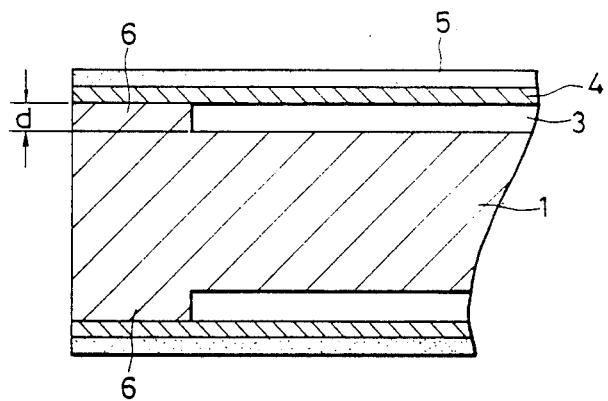
FIG. 2 is an enlarged sectional view of a part of the magnetic disc shown in FIG. 1.

In a magnetic disc to which the technical concept of the invention is applied, as shown in FIGS. 1 and 2, flexible annular sheets 2 having a magnetic layer 5 formed on a support 4 are bonded on both sides of a substrate 1 in such a manner that gaps 3 are formed between the substrate 1 and the flexible discs 2. The magnetic disc has a central hole 7 into which is inserted a rotary shaft (spindle) adapted to turn the magnetic disc.

The flexible discs 2 of the magnetic disc according to this invention may be made of the material which is used for manufacturing so-called "floppy discs". The flexible disc's support 4 may be made of plastic film such as polyethylene terephthalate. It is preferable that the support 4 is made of polyethylene terephthalate film which is biaxially-oriented (PET). It is desirable to employ the biaxially-oriented polyethylene terephthalate film which satisfies the following conditions. The biaxially-oriented polyethylene terephthalate film on which the magnetic layer has been formed has a shrinkage percentage of 0.2% or less and a difference between the horizontal and vertical shrinkage percentages of 0.1% or less, preferably 0.05%, after being subjected to heat treatment at about 70° C. for 48 hours. Furthermore, it is preferable that, in the case where an aluminum substrate 1 is employed, the horizontal and vertical coefficients of thermal expansion are close to those of aluminum, and the hygroscopic swelling coefficient should be small.

It is preferable that the side of the support of the flexible disc on which the magnetic layer is formed is not more than 0.1 micrometers in central roughness Ra. Using this support can increase the recording density of the manufactured magnetic disc. The magnetic layer 5 may be formed on the support by coating it with magnetic iron oxide or ferromagnetic alloy powder and binder, or it may be formed on the support by vacuum deposition, sputtering or ion plating. That is, it may be formed by vapor deposition or plating.

Cross-sections of the substrate 1 in the magnetic disc of the invention are as shown in FIGS. 1 and 2.

The gas 3 are formed for two purposes. First, when the magnetic layer 5 is brought into contact with the magnetic head, the frictional force is dispersed to increase the durability. Secondly, since the magnetic layer 5 can safely contact the magnetic head, the space between the head and the disc can be reduced to thereby permit high density recording. Therefore, the depth d of the gaps 3 is preferably at least 0.1 mm with a view to the use of the magnetic disc. In addition, because of the existence of the gaps 3, the flexibility of the flexible discs 2 is effectively utilized in coupling the disc surface to the magnetic head, the reason being not clearly known yet. Furthermore, it seems that the effect of dust on the magnetic layer 5 is decreased by the sweeping operation of the magnetic head.

In the above-described embodiment, the inner and outer peripheral parts 6 and 6 are extended horizontally as shown in FIGS. 1 and 2. However, they may be sloped. The inside and outside diameters of the substrate 1, and the dimensions of the inner and outer peripheral parts 6 and 6 may be freely determined according to the purpose of use of the magnetic disc.

The disc support 1 may be made of metal such as aluminum or aluminum alloy, glass, synthetic resin, resin mixed with filler, or combinations of these materials.

It is essential that the material of the substrate be inexpensive. As is apparent from FIG. 1, in the magnetic disc of the invention the magnetic layer is not affected by the surface roughness of the substrate. Therefore, even if the substrate is made of aluminum which is a typical metal, polishing the substrate may be relatively low in accuracy, and accordingly the polishing cost is low.

A polymer substrate is generally inexpensive because it can be mass-produced by injection molding.

In order to prevent the deformation of the substrate at high temperature, it is preferable to employ a heat-resistant crystalline polymer, or a noncrystalline polymer having a glass transition point of 80° C. or higher. Examples of the material are polycarbonate, polyphenylene sulfide, polysulfide polyimide, polysulfone, polyacrylate, polyether sulfone, polyether imide and polyether ether ketone.

In order to reduce the coefficient of expansion of the substrate, 5 to 35% metal oxide such as $TiO_2$ or $SiO_2$, or $BaSO_4$ or glass fibers by weight may be mixed with the above-described material.

In the magnetic disc of the invention, the thickness of the substrate is 1 to 5 mm, and the thickness of the flexible discs bonded on the substrate is generally 10 to 100 micrometers. Since the dimensional stability of the magnetic disc depends on that of the substrate, it is desirable that a substrate having excellent dimensional stability be employed.

In general, the material of the arm of the magnetic head is aluminum. Therefore, it is desirable that the coefficient of thermal expansion of the substrate is close to that of aluminum ($2.4 \times 10^{-5}$/° C.) and the hygroscopic swelling coefficient be as small as possible, similarly as in the case of the flexible sheet support.

The flexible discs are bonded on the substrate. The adhesive may be a thermo-setting adhesive, or a radiation setting adhesive such as an adhesive set by an electron beam or by ultra-violet rays.

In order to facilitate the bonding operation, it is preferable to coat one or both of the bonding surfaces with a polymer such as polyester or polycarbonate, or to subject to physical surface treatment such as corona discharge, glow discharge or flame treatment.

In bonding the flexible discs to the substrate, in order to prevent the bending of the flexible sheets as was described before, the flexible sheets on both sides of the substrate are so arranged that the sheet supports coincide with each other in the machine direction, and preferably both in the machine direction and in the optical axis direction. These terms will be explained below.

It is known that the supports can have properties that vary regularly over their surfaces. In the invention, the term "optical axis direction" is intended to mean the direction in which the support has its minimum thermal expansion coefficient and its minimum hygroscopic swelling coefficient. The term "machine direction" is intended to mean the direction of anisotropic mechanical characteristics of the resin which depends on the molecular orientation, that is, the direction in which the support has its maximum thermal shrinkage percentage. Both the optical axis direction and the machine direction depend on the molecular orientation produced at the time of formation of the resin material.

Figure 3:
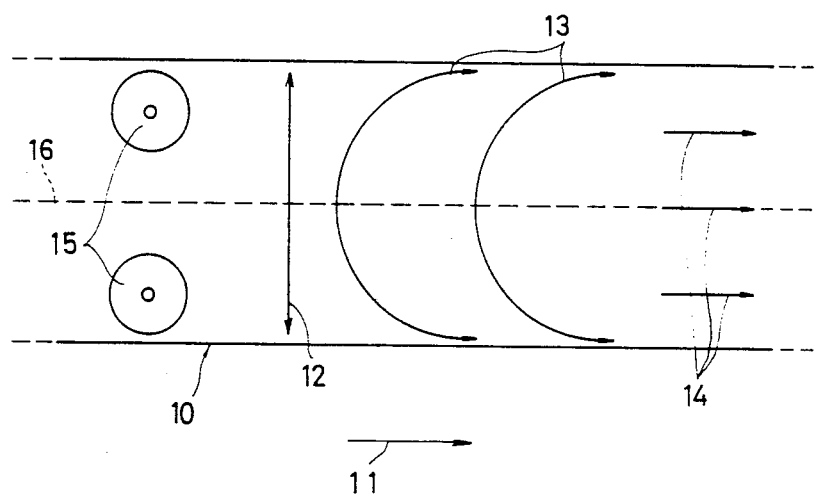
FIG. 3 is a schematic view illustrating direction characteristics of resin material, from which supports of flexible sheets of a magnetic disc of the present invention are punched out.

In general, the support is manufactured by using a long strip of resin material which has been cooled and rolled. As shown in FIG. 3, in the long strip of resin material 10, the machine direction 14 coincides with the travelling direction 11 of the resin material 10, at any position in the long strip of resin material 10. The transverse direction 12 and the optical axis direction 13 coincide with each other at the middle of the material. The transverse direction 12 shifts from the optical axis direction at a certain rate at points progressively closer to the lateral edges. Therefore, a pair of doughnut-shaped supports 15, 15 which are equidistant from the central axis 16 and have the same shifts of the machine direction 14 and the optical axis direction 13 are punched out of the support material. The supports thus obtained are bonded on both sides of the substrate in such a manner that they are arranged back to back without changing those direction. In this case, the supports coincide with each other in machine direction and thermal shrinkage percentage, and in optical axis direction, thermal expansion coefficient and hygroscopic swelling coefficient. The coincidence only in machine direction and thermal shrinkage percentage can be obtained according to the method in which a pair of supports are obtained by using the parts of the support material strip which are equi-distant from the central axis 16 thereof in the transverse direction. The supports thus obtained are bonded on both sides of the substrate in such a manner that they coincide with each other only in the directivity of the resin material (it is unnecessary to place them back to back).

However, the latter method is seldom employed because, in general, the magnetic layer is formed before cutting the resin material strip on the flexible sheet manufacturing line.

In the invention, the bending decreases as the shift of the machine direction and that of the optical axis direction are decreased. However, bending increases exponentially as the shifts increase. The acceptable bend preventing effect is obtained with a $\pm 15°$ shift range in the machine direction and with a $\pm 20°$ shift range in the optical axis direction.

The magnetic disc according to the invention will be further described with reference to a specific example. However, it should be noted that the invention is not limited thereto or thereby.

FABRICATION OF THE FLEXIBLE SHEETS

One side of a biaxial orientation polyethylene terephthalate film 35 micrometers in thickness whose machine and optical axis directions have been measured was coated with a magnetic solution having the following composition. The film thus treated was subjected to drying and calendering so that a magnetic layer 1.5 micrometer in thickness was formed. Doughnut-shaped flexible sheets were formed by punching the film thus processed.

MAGNETIC SOLUTION $\gamma$-$Fe_2O_3$: 300 parts by weight,
PVC-Ac (vinyl chloride - vinyl acetate copolymer) (VYHH manufactured by UCC Co.): 40 parts by weight,
Epoxy resin (Epikote 1001 manufactured by Shell Chemical Co.): 40 parts by weight,
Polyamide (Versamid 115 manufactured by General Mills Inc.): 20 parts by weight,
Methyl isobutyl ketone/xylol (2/1): 800 parts by weight.

FABRICATION OF THE SUBSTRATE

A substrate of polyether imide mixed with 30% glass fibers was formed by injection molding.

The configuration of the substrate was as shown in FIG. 1. The inside and outside diameters of the substrate were 40 mm and 130 mm, respectively, and the bonding rings 6 were 2 mm in width. The thickness of the substrate was 2 mm, and the depth d of the gaps 3 was 0.25 mm. After applying a thermo-setting epoxy resin to the substrate thus formed, the two flexible sheets were bonded to the substrate with the support machine direction changed as listed below. The discs were then dried at room temperature for twenty-four (24) hours. A number of magnetic discs were thus prepared.

These magnetic discs thus prepared were subjected to heat treatment at 70° C. for 168 hours (one week), and then measured for bending. In the measurement, a rotary shaft held vertically was inserted into the central hole of each of the samples. The maximum value of the vertical shift of the disc periphery with respect to the central hole was measured as a bending value. A decrease of the electrically measured magnetic output was also measured.

The following Table 1 indicates the angles formed by the machine directions of the two supports of the flexible discs bonded on the substrate and the associated decrease of the output thus measured.

TABLE 1

| Sample No. | Angle between machine directions | Bend (max) | Output decrease (max) |
|---|---|---|---|
| 1 | 0° | 0 mm | 0 dB |
| 2 | ±15° | 0.3 mm | −0.2 dB |
| 3 | ±30° | 0.6 mm | −0.9 dB |
| 4 | ±45° | 1.0 mm | −1.5 dB |
| 5 | ±60° | 1.5 mm | −2.5 dB |
| 6 | ±75° | 2.1 mm | −3.4 dB |
| 7 | ±90° | 2.8 mm | −4.0 dB |

As is apparent from Table 1 above, the sample in which the two flexible disc supports have machine directions which coincide with each other in machine direction or in which both machine direction and optical axis direction coincide, is free from the difficulties that the magnetic disc is bent and its output is decreased.

If the angle $\theta$ between the machine directions is within ±15°, then the degree of bending and the output decrease are small, and the magnetic disc is acceptable in practical use.

What is claimed is:
1. In a recording disc, comprising:
 a circular substrate having on each of two principal sides at least an exterior peripheral annular planar bonding ring rising above a recessed planar surface; and two circular flexible sheets, each comprising a support and a recording medium formed thereon and being bonded on a respective principal side of said substrate at the outer periphery thereof to said bonding ring and forming a gap between said sheet and said recessed planar surface; the improvement wherein said two sheets bonded to said bonding rings have supports with given mechanical anistrophy and wherein the shift angle between the mechanical anistrophy of said support of a first one of said sheets and a corresponding mechanical anistrophy of said support of a second one of said sheets is within the range of 0° to 15°, whereby the resistance to bending of the magnetic disc is improved, and the loss in magnetic output minimized.

2. A recording disc as recited in claim 1, wherein the support of each of said sheet bonded to said bonding rings have aligned mechanical anistrophy directions.

3. A recording disc as recited in claim 2, wherein said support has an optical axis direction of a first one of said sheets aligned with a corresponding optical axis direction of said support of a second one of said sheets.

4. A recording disc as recited in claim 3 wherein said substrate is formed of aluminum, said support is a biaxially-oriented polyethylene teraphalate film having a magnetic layer formed thereon with a shrinkage percentage of 0.2° or less, wherein the horizontal and vertical coefficients of thermal expansion are close to those of the aluminum substrate and the hydroscopic swelling coefficient is small.

5. The recording disc as claimed in claim 4 wherein said magnetic layer consists of magnetic iron oxide.

6. The recording disc as recited in claim 4 wherein said magnetic layer consists of a ferromagnetic alloy powder and binder.

* * * * *